United States Patent
Figus (10) Patent No.: US 8,805,864 B2
(45) Date of Patent: Aug. 12, 2014

(54) MULTI-CLIENT GENERIC PERSISTENCE FOR EXTENSION FIELDS

(75) Inventor: Daniel Figus, Wallduern (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/482,807

(22) Filed: May 29, 2012

(65) Prior Publication Data

US 2012/0239707 A1 Sep. 20, 2012

Related U.S. Application Data

(63) Continuation of application No. 12/644,344, filed on Dec. 22, 2009, now Pat. No. 8,224,828.

(51) Int. Cl.
*G06F 17/30* (2006.01)

(52) U.S. Cl.
CPC .... *G06F 17/30286* (2013.01); *G06F 17/30067* (2013.01); *G06F 17/30861* (2013.01)
USPC ........... 707/756; 707/692; 707/609; 707/755; 707/682; 707/602; 709/201; 709/203; 709/213; 709/217; 717/168

(58) Field of Classification Search
CPC .................. G06F 17/30286; G06F 17/30067; G06F 17/30861
USPC .................. 707/755, 756, 692, 602, 609, 682
See application file for complete search history.

(56) References Cited

U.S. PATENT DOCUMENTS

| 5,495,610 | A | 2/1996 | Shing et al. |
| 5,560,005 | A | 9/1996 | Hoover et al. |
| 5,625,815 | A | 4/1997 | Maier et al. |
| 5,712,960 | A | 1/1998 | Chiopris et al. |

(Continued)

FOREIGN PATENT DOCUMENTS

| DE | 19734413 C1 | 1/1999 |
| DE | 19803697 C2 | 3/2000 |

(Continued)

OTHER PUBLICATIONS

Das, et al., "Conflict-Free Data Access of Arrays and Trees in Parallel Memory Systems", IEEE, pp. 377-384, Oct. 26-29, 1994.

(Continued)

*Primary Examiner* — Frantz Coby
(74) *Attorney, Agent, or Firm* — Mintz Levin Cohn Ferris Glovsky and Popeo, P.C.

(57) ABSTRACT

Access to a networked application can be provided to multiple users while allowing user-specific extension fields to be created and maintained for exclusive access by the user creating the extension field. A user-customized data object that includes a standard field value of a standard field of a standard data object defined by the networked application and a user-specific extension field value of a user-specific extension field that modifies operation of the networked application for the user and that is not available to other users of the plurality of users can be received from a user for writing to memory. The user-specific extension field value can be separated from the standard field value. The standard field value and the user-specific extension field value can be persisted in a first database table and a second database table, respectively. Related systems, methods, and articles of manufacture are also provided.

20 Claims, 8 Drawing Sheets

(56) References Cited

U.S. PATENT DOCUMENTS

| | | | |
|---|---|---|---|
| 5,784,069 A | 7/1998 | Daniels et al. | |
| 5,802,514 A | 9/1998 | Huber | |
| 5,841,972 A | 11/1998 | Fanshier | |
| 5,893,119 A | 4/1999 | Squibb | |
| 5,909,570 A | 6/1999 | Webber | |
| 5,920,725 A | 7/1999 | Ma et al. | |
| 5,960,181 A | 9/1999 | Sanadidi et al. | |
| 5,983,229 A | 11/1999 | Houchin et al. | |
| 6,006,216 A | 12/1999 | Griffin et al. | |
| 6,018,743 A | 1/2000 | Xu | |
| 6,044,378 A | 3/2000 | Gladney | |
| 6,088,693 A | 7/2000 | Van Huben et al. | |
| 6,094,654 A | 7/2000 | Van Huben et al. | |
| 6,094,684 A | 7/2000 | Pallmann | |
| 6,119,117 A | 9/2000 | Yoda et al. | |
| 6,122,630 A | 9/2000 | Strickler et al. | |
| 6,141,664 A | 10/2000 | Boothby | |
| 6,167,405 A | 12/2000 | Rosensteel, Jr. et al. | |
| 6,205,451 B1 | 3/2001 | Norcott et al. | |
| 6,243,711 B1 * | 6/2001 | Wu et al. | 1/1 |
| 6,282,712 B1 | 8/2001 | Davis et al. | |
| 6,385,770 B1 | 5/2002 | Sinander | |
| 6,484,309 B2 | 11/2002 | Nowlin, Jr. et al. | |
| 6,697,846 B1 | 2/2004 | Soltis | |
| 6,763,403 B2 | 7/2004 | Cheng et al. | |
| 6,779,155 B1 | 8/2004 | Bahrs et al. | |
| 6,820,071 B1 | 11/2004 | Sullivan | |
| 6,823,384 B1 | 11/2004 | Wilson et al. | |
| 7,050,056 B2 | 5/2006 | Meyringer | |
| 7,117,504 B2 | 10/2006 | Smith et al. | |
| 7,130,970 B2 | 10/2006 | Devassy et al. | |
| 7,139,774 B2 | 11/2006 | Dettinger et al. | |
| 7,236,991 B2 | 6/2007 | Becker et al. | |
| 7,350,192 B2 | 3/2008 | Seitz et al. | |
| 7,370,092 B2 | 5/2008 | Aderton et al. | |
| 7,386,578 B2 | 6/2008 | Fuerst | |
| 7,409,385 B2 | 8/2008 | Lindsay et al. | |
| 7,555,436 B2 | 6/2009 | Brown | |
| 7,606,881 B2 | 10/2009 | Chasman et al. | |
| 7,852,843 B2 * | 12/2010 | Liu et al. | 370/392 |
| 7,870,120 B2 * | 1/2011 | Andreev et al. | 707/713 |
| 7,996,828 B2 | 8/2011 | Massmann et al. | |
| 8,082,294 B2 | 12/2011 | Krahulec et al. | |
| 8,224,828 B2 * | 7/2012 | Figus | 707/756 |
| 2002/0021788 A1 | 2/2002 | Kasvand et al. | |
| 2002/0023108 A1 * | 2/2002 | Daswani et al. | 707/507 |
| 2002/0138565 A1 | 9/2002 | Kustov et al. | |
| 2003/0005109 A1 | 1/2003 | Kambhammettu et al. | |
| 2003/0233571 A1 | 12/2003 | Kraus et al. | |
| 2004/0034799 A1 | 2/2004 | Mikami | |
| 2004/0054764 A1 | 3/2004 | Aderton et al. | |
| 2004/0107125 A1 | 6/2004 | Guheen et al. | |
| 2004/0122865 A1 | 6/2004 | Stahl et al. | |
| 2005/0022163 A1 | 1/2005 | Brendle et al. | |
| 2005/0065925 A1 | 3/2005 | Weissman et al. | |
| 2005/0080792 A1 | 4/2005 | Ghatare | |
| 2005/0216573 A1 | 9/2005 | Gutjahr | |
| 2005/0216681 A1 | 9/2005 | Micka et al. | |
| 2005/0222851 A1 | 10/2005 | Dubey et al. | |
| 2005/0223022 A1 | 10/2005 | Weissman et al. | |
| 2005/0235107 A1 | 10/2005 | Ohno et al. | |
| 2005/0267975 A1 | 12/2005 | Qureshi et al. | |
| 2005/0283478 A1 | 12/2005 | Choi et al. | |
| 2006/0088027 A1 | 4/2006 | Becker | |
| 2006/0130037 A1 | 6/2006 | Mackay | |
| 2006/0130045 A1 | 6/2006 | Wesley et al. | |
| 2006/0136898 A1 | 6/2006 | Bosscha et al. | |
| 2006/0195449 A1 | 8/2006 | Hunter et al. | |
| 2006/0206834 A1 | 9/2006 | Fisher et al. | |
| 2006/0236408 A1 | 10/2006 | Yan | |
| 2006/0242150 A1 | 10/2006 | Jogand-Coulomb et al. | |
| 2006/0293934 A1 | 12/2006 | Tsyganskiy et al. | |
| 2007/0005634 A1 | 1/2007 | Selca et al. | |
| 2007/0088741 A1 | 4/2007 | Brooks et al. | |
| 2007/0124365 A1 | 5/2007 | Chen et al. | |
| 2007/0150677 A1 | 6/2007 | Homma et al. | |
| 2007/0156650 A1 | 7/2007 | Becker | |
| 2007/0156699 A1 | 7/2007 | Becker | |
| 2007/0156700 A1 | 7/2007 | Becker | |
| 2007/0156714 A1 | 7/2007 | Becker | |
| 2007/0156806 A1 | 7/2007 | Becker et al. | |
| 2007/0156848 A1 | 7/2007 | Becker et al. | |
| 2007/0156849 A1 | 7/2007 | Becker | |
| 2007/0156901 A1 | 7/2007 | Becker et al. | |
| 2007/0156902 A1 | 7/2007 | Becker | |
| 2007/0162451 A1 | 7/2007 | Becker | |
| 2007/0162452 A1 | 7/2007 | Becker | |
| 2007/0162969 A1 | 7/2007 | Becker | |
| 2007/0174398 A1 | 7/2007 | Addante | |
| 2007/0266031 A1 | 11/2007 | Adams et al. | |
| 2008/0010285 A1 | 1/2008 | Rajan et al. | |
| 2008/0071442 A1 | 3/2008 | Gray et al. | |
| 2008/0092068 A1 | 4/2008 | Norring et al. | |
| 2008/0162483 A1 | 7/2008 | Becker et al. | |
| 2008/0162490 A1 | 7/2008 | Becker et al. | |
| 2008/0162491 A1 | 7/2008 | Becker et al. | |
| 2008/0162509 A1 | 7/2008 | Becker | |
| 2008/0162536 A1 | 7/2008 | Becker et al. | |
| 2008/0162564 A1 | 7/2008 | Massmann et al. | |
| 2008/0162587 A1 | 7/2008 | Auer et al. | |
| 2008/0162622 A1 | 7/2008 | Becker et al. | |
| 2008/0162660 A1 | 7/2008 | Becker | |
| 2008/0301153 A1 | 12/2008 | Greer et al. | |
| 2009/0094524 A1 | 4/2009 | Abbott et al. | |
| 2009/0300054 A1 * | 12/2009 | Fisher et al. | 707/102 |
| 2012/0079363 A1 * | 3/2012 | Folting et al. | 715/227 |

FOREIGN PATENT DOCUMENTS

| | | |
|---|---|---|
| EP | 0952521 B1 | 10/2003 |
| EP | 1338928 B1 | 11/2007 |
| JP | 2000-347966 A | 12/2000 |
| WO | WO-99/08206 A1 | 2/1999 |
| WO | WO-03/107178 A3 | 12/2005 |

OTHER PUBLICATIONS

European Search Report dated Sep. 3, 2007, for counterpart European Patent Application No. 04104365.4.

International Search Report dated May 28, 2002, for PCT application No. PCT/EP01/06118.

Jiang et al., "Protection Mechanisms for Application Service Hosting Platforms", IEEE, pp. 656-663, Apr. 19-22, 2004.

Pasman et al., "Organizing Ad Hoc Agents for Human-Agent Service Matching", IEEE, pp. 278-287, Aug. 22-26, 2004.

Radeke et al., "Functionality for Object Migration Among Distributed, Heterogeneous, Autonomous DBS", IEEE, pp. 58-66, 1995.

Sterbenz et al., "Axon: A High Speed Communication Architecture for Distributed Applications", IEEE, vol. 2, pp. 415-425, Jun. 3-7, 1990.

Tan et al., "A New Secure Network Upgrade System", The First International Symposium on Data, Privacy, and E-Commerce, pp. 421-423, Nov. 1-3, 2007.

Wang et al., "A Technique for Upgrading Database Machines Online", Advances in Information Systems, First International Conference Proceedings, Advis 2000, Izmir, Turkey, pp. 82-91, Oct. 25-27, 2000.

* cited by examiner

MULTI-CLIENT GENERIC PERSISTENCE FOR EXTENSION FIELDS

CROSS REFERENCE TO RELATED APPLICATION

The current application is a continuation under 35 U.S.C. §120 of U.S. patent application Ser. No. 12/644,344, filed on Dec. 22, 2009 now U.S. Pat. No. 8,224,828, which is incorporated herein by reference in its entirety.

TECHNICAL FIELD

The subject matter described herein relates to supporting multiple independent users at a physical system while maintaining data isolation.

BACKGROUND

Software as a service (SAAS) continues to grow as an approach to providing remote access to one or more solutions, which can include applications, standard data objects, databases, and the like, that are hosted at a physical system. To enable customization of the solutions by a user, it can be possible to add one or more extension fields or other modifications to the data objects, databases, applications, etc. The extension fields or other modifications made to customize the solutions for one organization or customer should not be available or visible to another organization or customer. If a dedicated physical system provides the solutions to a single organization or user, customizations can be made directly to the structures of the underlying records, data objects, databases, applications, etc. For example, extension fields can be attached or appended directly to a core database table. The appended extension fields can be translated into database table column layout changes, for example using an Advanced Business Application Programming (ABAP, available from SAP AG, Walldorf, Germany) data dictionary, an "ALTER TABLE" Structured Query Language (SQL) command, or the like.

SUMMARY

In one aspect, a method includes receiving, at a physical system that includes a processor and a memory, a user-customized data object to be written to the memory. The physical system provides access to a networked application for more than one user. The user-customized data object includes a standard field value of a standard field of a standard data object defined by the networked application and a user-specific extension field value of a user-specific extension field that modifies operation of the networked application for a user and that is not available to other users. The user-specific extension field value is separated from the standard field value. The standard field value is persisted in a first database table at the physical computing system and the user-specific extension field value is persisted in a second database table at the physical computing system. The persisting of the user-specific extension field value includes creating, deleting, or modifying an extension field data record in the second database table. The extension field data record includes the user-specific extension field value and at least one key value that references the one of the plurality of users, the standard data object, an instance of the standard data object with which the user-specific extension field value is associated, and the user-specific extension field.

In optional variations, one or more additional features can also be included. The user-customized data object can be produced for use by the user with the networked application by reading the extension field data record from the second database table and the standard field value from the first database table, converting the extension field data record to the user-specific extension field value, and combining the user-specific extension field value and the standard field value into the user-customized data object. The user-customized data object can include an additional user-specific extension field value that is also separated from the standard field value and persisted in the second database table. The persisting of the additional user-specific extension field value can include creating, deleting, or modifying an additional extension field data record in the second database table. The additional extension field data record can include the additional user-specific extension field value and at least one additional key value that references the one of the plurality of users, the standard data object, the instance of the standard data object, and the additional user-specific extension field.

The second database table can include a first row that includes the extension field data record and a second row that includes the additional extension field data record. The second or other additional rows of the second database table can row can alternatively or in addition include a second extension field data record of a second user of the networked application.

The persisting of the user-specific extension field value can include modifying the extension field data record in the second database table to replace a previous user-specific extension field value in the extension field data record with the user-specific extension field value if the extension field data record already exists in the second database table. If the user-specific extension field value is equivalent to a default value of the user-specific extension field, the persisting of the user-specific extension field value can include deleting the extension field data record in the second database table.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, data of multiple users whose data applications are hosted on the same physical system can be isolated such that data and customizations of a first user are not visible or accessible by a second user at the same physical system. Hosting of multiple users on one physical system can provide substantial performance and resource consumption benefits. For example, if a dedicated physical system is provided for each user, each such physical system must match a minimum set of performance benchmarks. However, the hardware and network resources required to meet those performance benchmarks may lie largely idle during the user's downtime (for example after business hours). Serving multiple users on one system can permit more efficient use of hardware and network resources that can significantly reduce costs while also improving the performance experienced by each user.

Other aspects of the current subject matter can also minimize the scale of work required for adoption of a new version of an application by a user. Generation of new data fields that are customized to a specific user is facilitated by removing the requirement of altering the database table layout of the standard data objects used by an application. Development efforts, both by the application provider and by users, can be minimized. Hosting of multiple users on one physical system can also reduce maintenance requirements while improving system reliability as redundant storage systems and multiple processors can be economically integrated into a single physical system such that continuous operation can be provided even during system upgrades or modification and/or routine and emergency maintenance situations.

The details of one or more variations of the subject matter described herein are set forth in the accompanying drawings and the description below. Other features and advantages of the subject matter described herein will be apparent from the description and drawings, and from the claims.

Some aspects of the current subject matter address the use of persistent storage for retaining values of fields used in data objects of one or more applications. While reference is made to manipulations of columns or rows of one or more database tables, it will be readily understood to one of ordinary skill in the art that row and column operations are interchangeable depending on the orientation of a two dimensional database table. The following description is provided to explain aspects of the current subject matter that apply to any configuration of database tables or other structured storage of persisted values of fields of data objects used by one or more applications. For simplicity, various aspects of the current subject matter are described in reference to database tables in which an individual record having one or more fields is stored on each row of a database table. Addition or deletion of a column of the database table corresponds to addition or deletion of a field of each record stored in the database table as well as the values of that field in each of the records stored in the database table. Addition or deletion of a row of such a table corresponds to addition or deletion of an individual record and the values of all fields associated with the individual record. However, a database table can also be transposed such that each column stores an individual record and each row represents a field that can have values for each record stored in the database table. Database tables having more than row and column dimensions are also within the scope of the current subject matter, and manipulation of persisted values in fields of data records can be performed in an analogous manner to those addressed in the following description.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

While use of a dedicated physical system for one user can ensure security of data and customizations to the standard solutions, the hardware requirements to support a large number of users, customers, or organizations in this manner can be substantial. The processing resources required to support separate physical systems to provide customized solutions to each of a large number of users can become particularly acute, especially if the size and/or processing demands of each is relatively small. It can be desirable to use one physical system to provide access to a suite of solutions to multiple remote users or organizations so that server and network resources can be shared. Each remote user or organization can modify the standard data objects, databases, and other underlying data structures supporting the remotely provided solutions and applications to customize these solutions and applications to support their individual business processes.

One way of performing such modifications or customizations is to add extension fields, which are also referred to as user defined data fields, to a standard data object format provided by the applications and solutions. The standard data objects can also be referred to as standardized business objects. In many instances, the extension fields added by a first user are advantageously not visible or accessible to a second user who accesses the networked application at the same physical system and whose data are also stored on the same multi-client physical system. Adding the extension fields as new columns to a table can break the isolation and make the customer specific fields visible to other users residing on the same physical system. For the purposes of this disclosure a physical system refers to a system that includes at one processor and at least one memory.

In prior approaches, upon addition by a user of an extension field to a data object used by a networked application, the databases tables associated with that data object are modified to add new columns. Storing of extension fields in a physical system that supports only one customer per physical system was supported and adding the data fields as columns to a database table was possible. However, adding a new column to a database table can also be labor intensive and can require a generation process that can render the data inaccessible for some length of time. Furthermore, databases can have a maximum allowable number of columns. Addition of a new column for every new extension field of one or more customers on a physical system can cause the number of columns in a database table to approach this maximum. Very high support costs can result for a vendor or technical support provider of a database management or enterprise resource management system.

Adding a new extension field according to the current subject matter need not cause a change in the column layout of any table in a relational database. Therefore the extension process can be extremely fast as only some metadata is written describing the extension field definition. As noted, the storage solution allows user-specific extension fields in a multi-client system while ensuring isolation of client data and data structures. The standard and extension field data can also be clearly separated from each other. This separation can provide for easier maintenance for an application developer who needs not think of the extensions to his or her database table when performing any changes to the standard objects.

New extension fields can be created in multi-client systems to allow system features to be tailored to an enterprise's specific business processes.

Figure 1:
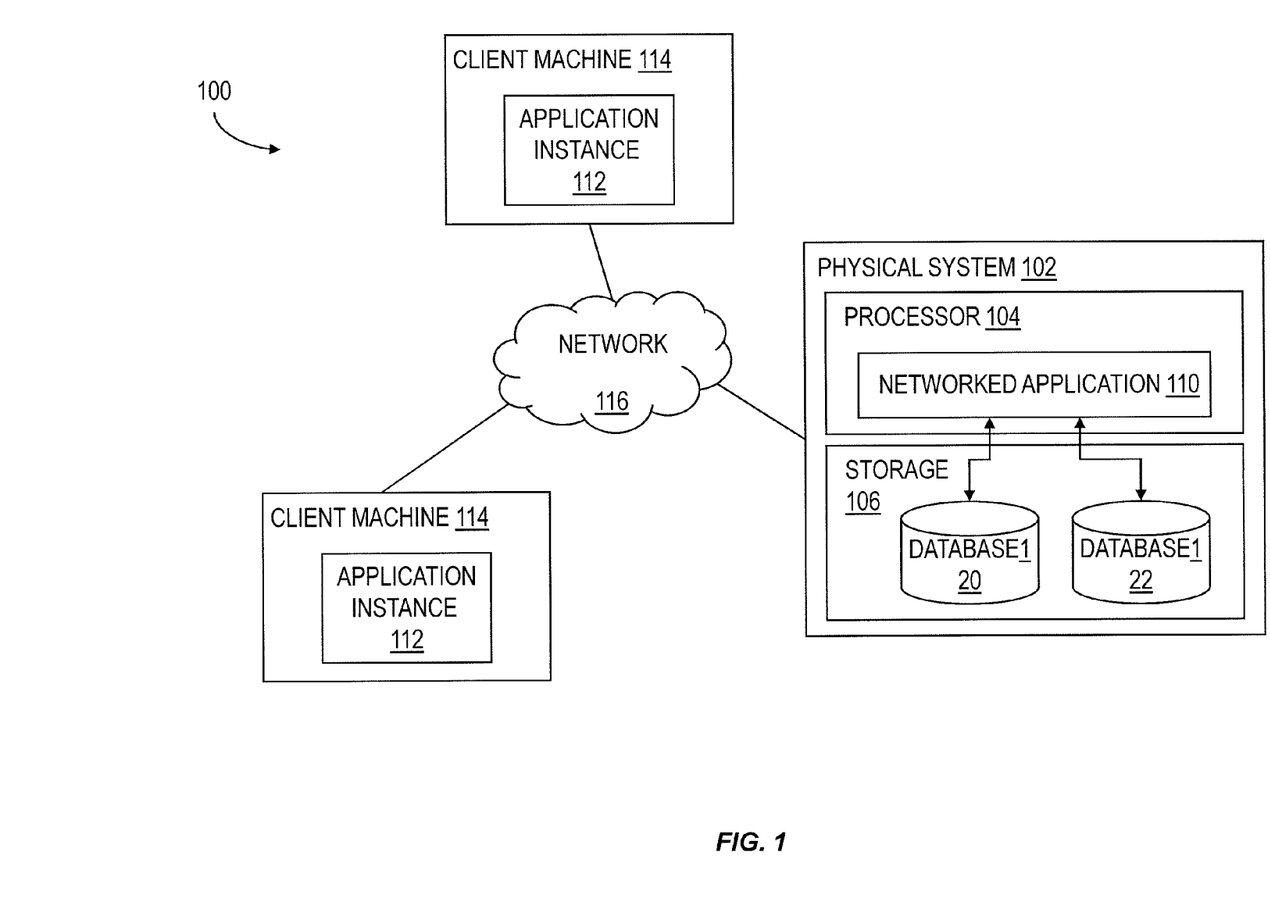
FIG. 1 shows a block diagram showing a system.

FIG. 1 shows a block diagram illustrating aspects of a system 100 usable in conjunction with the currently disclosed subject matter. A physical system 102, which can include one or more processors 104 and one or more memories or data storage devices 106, provides access to a networked application 110. The networked application 110 is available for execution as application instances 112 presented to multiple customers, users, organizations, or the like who connect from client machines 114 to the physical system 102, for example over a network 116. Access to an instance of the network application can also be possible locally at the physical system 102. To simplify the descriptions provided herein, the term "user" is used throughout this disclosure to refer to an entity, be it a person, a system, an application, or the like, that accesses the networked application 110 at the physical system 102 over a network 116. The network 116 can be wired, wireless, or a combination thereof. Examples of a network 116 include, but are not limited to, the Internet, an intranet, a wide or local area network, or the like.

Via an application instance 112 of the networked application 110 at a client machine 114, a user can add user-specific customizations to standard features and standard data objects provided by the networked application 110. For example, if the networked application 110 provides sales order functionality, it can make use of a standard data object that includes standard fields such as the object name 202, the object node 204, and a node identifier 206 as shown in the database table 200 of FIG. 2. While the discussion of standard database tables has so far included database tables having technical fields, such as for example object name and node, as the first two columns, it should be noted that all standard database tables need not have such fields. A dedicated database table can be provided for an object name and node combination. For example, a database table can be dedicated to the sales order header which has the node identifier as the first technical field to identify the sales order instance. Non-technical standard fields in such a database table can be the name of the sales order, the buyers name, the total amount of the sales order, and the like. These standard fields and other standard fields for standard data objects are stored in a first database 120 retained in storage 106 at the physical system 102. A separate first database can be assigned for each user to ensure data isolation. Alternatively, the data of all users can be included in a single database 120 if the database 120 includes a client identification field or other means of pairing data to a specific user.

Figure 2:
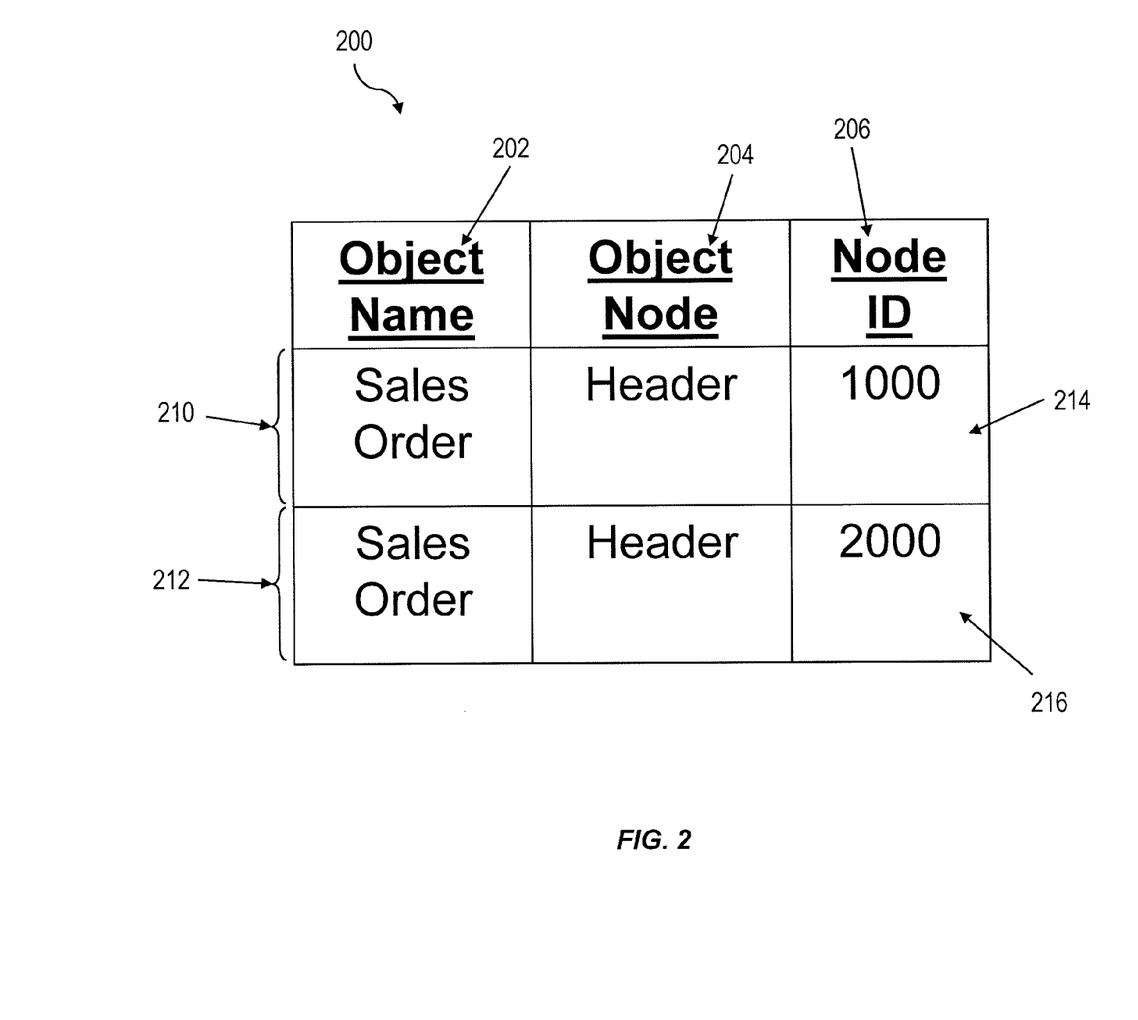
FIG. 2 shows a table representing standard fields of a data object.
Figure 3:
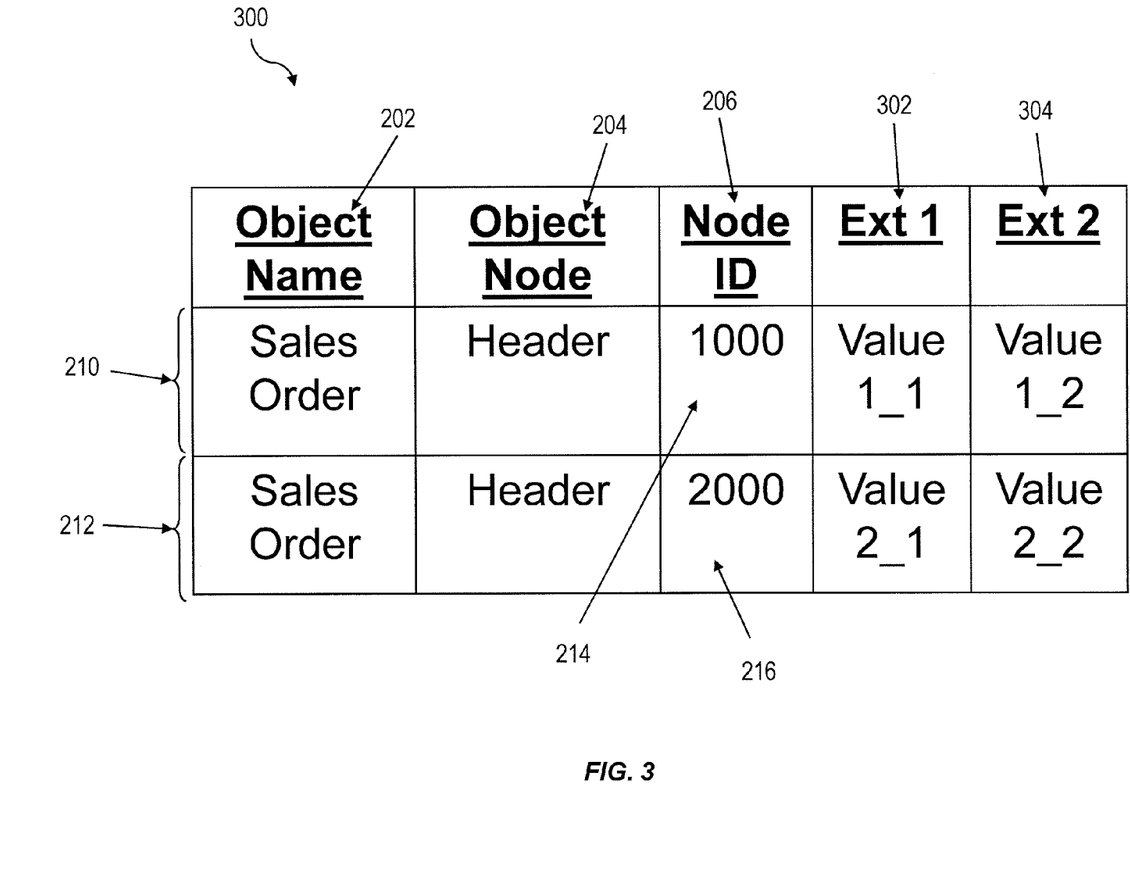
FIG. 3 shows a table representing standard and extension fields of a data object.

FIG. 2 shows storage of values for two instances of the standard business object which are stored on rows 210, 212 of the database table 200. The instances are labeled with different values 214, 216 of the node ID field 206. As shown in the customized database table 300 of FIG. 3, a user can add customized fields to the standard business objects by adding additional columns to the standard database table 200. These customized fields can also be referred to as extension fields. The customized database table 300 in FIG. 3 illustrates how such a database table is presented to a user—two extension fields 302, 304 are added as new columns in the customized database table 300. The values of the standard and extension fields for each instance of the data object continue to be stored on rows 210, 212 of the database table 300.

For a framework in which each individual user accesses the networked application at a dedicated physical system 102 that is not shared with other users outside of the user's organization, the standard database table 200 can be modified at the physical system by adding new columns to account for each new extension field. The standard database table 200 is then replaced or augmented at the physical system 102 by a new database structure comparable to customized database table 300. This approach is illustrated in the block diagram 400 of FIG. 4. As part of running an instance 112 of a networked application 110, a user 402 accesses one or more instances of a customized data object 404 that includes both a standard data object part 406 including standard fields and an extension part 410 featuring one or more customized extension fields. Values for the standard fields and for the extension fields are stored together in a storage 106 at the physical system 102 as a customized database table 300 that includes additional column structure 412 added to the standard database table 200. The additional column structure includes extension field columns storing data corresponding to the extension part 410 of the customized data object 404. As each user accesses user-specific data and data objects stored at one dedicated physical system 102, the user-specific data and customized data objects can be stored in the manner shown in FIG. 4 without concern for other users being able to view or modify the user's user-specific data and customized data objects.

In a multi-client system in which user-specific data and customized data objects for multiple users are stored at the same physical system 102, creating extension fields to provide customized data objects for one user can create data security and other administrative problems. Use of the approach shown in FIG. 4 to provide access to multiple users can require that the standard data object features be replicated for each user in a separate database that is accessible only to that user. Each user can add extension fields that are supported by converting the standard database table 200 to a customized database table 300 with additional columns added for each extension field.

Figure 5A:
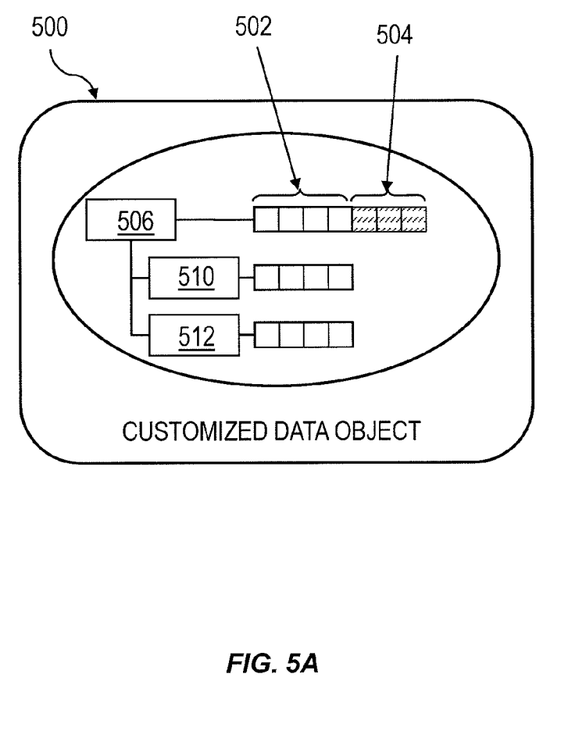
FIG. 5A shows a customized data object.
Figure 5B:
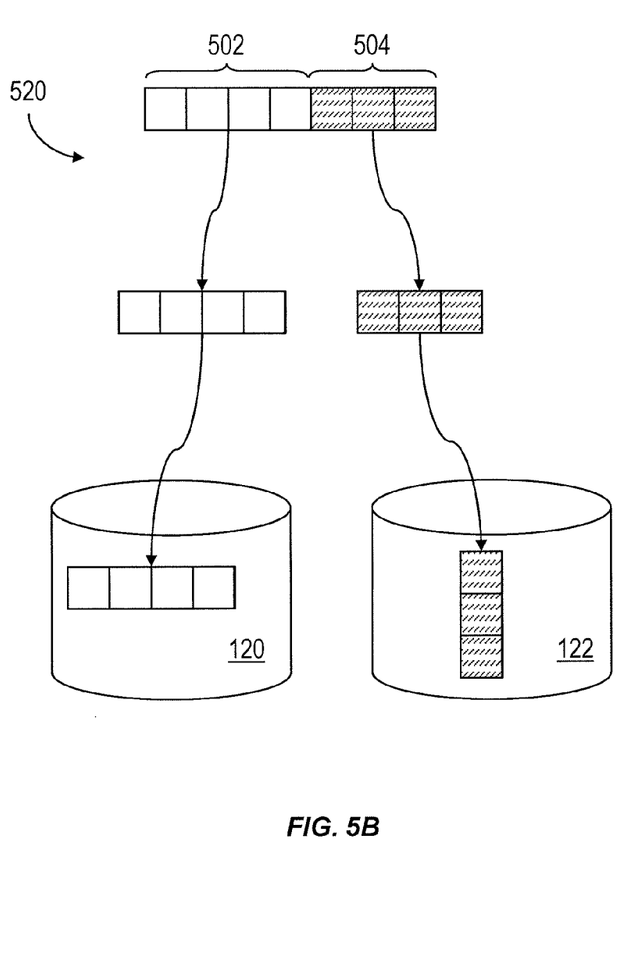
FIG. 5B shows splitting of standard and extension fields.

Because networked applications can have numerous standard data object fields, creating a complete customized database table for each user can lead to substantial replication of data structures in the storage 106 of the physical system 102. Additionally, administrating a framework in which customized database tables 300 are maintained for every user of a networked application 110 can lead to a great deal of non-standardization and increased support costs. In some aspects, the current subject matter addresses this issue by bifurcating the standard data object fields from the extension fields and storing them separately at the physical system. As shown in FIG. 5A, a data object 500 can include standard fields 502 and extension fields 504 that are user-added and user-specific. One instance 506 of the data object 500 can include active values in the extension fields while a second instance 510 and a third instances 512 can have those fields blank or filled with a default value. The data object 500 can be presented to a user as shown in FIG. 5A while the data associated with the standard fields 502 and extension fields 504 are stored separately as shown in the data tree diagram 520 of FIG. 5B. Data for the standard fields 502 can be stored in a first database 120 at the physical system 102 while data for the extension fields can be stored in a second database 122 at the physical system 102.

Figure 6:
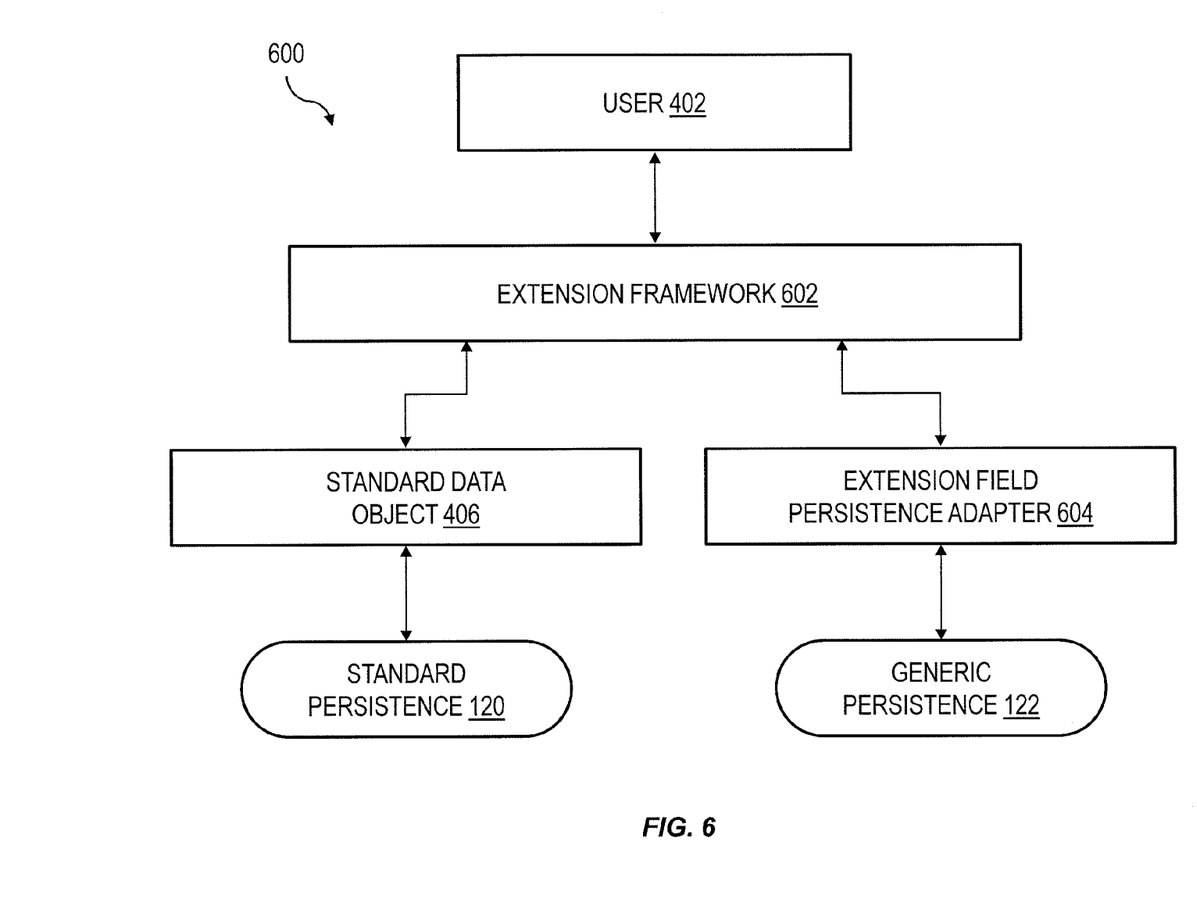
FIG. 6 shows a second block diagram of a second data object customization approach.

As shown in the block diagram 600 of FIG. 6, an extension framework 602 can be provided to split a customized data object 500 into standard fields 502 that are stored in the first, standard database table 120 and extension fields 504 that are stored in the second, extension database table 122 in the storage 106 of the physical system. The extension framework 602 can optionally be implemented at the physical system, 102, at each client machine 114, or at some intermediate processing system between the physical system 102 and the client machine 114.

Figure 4:
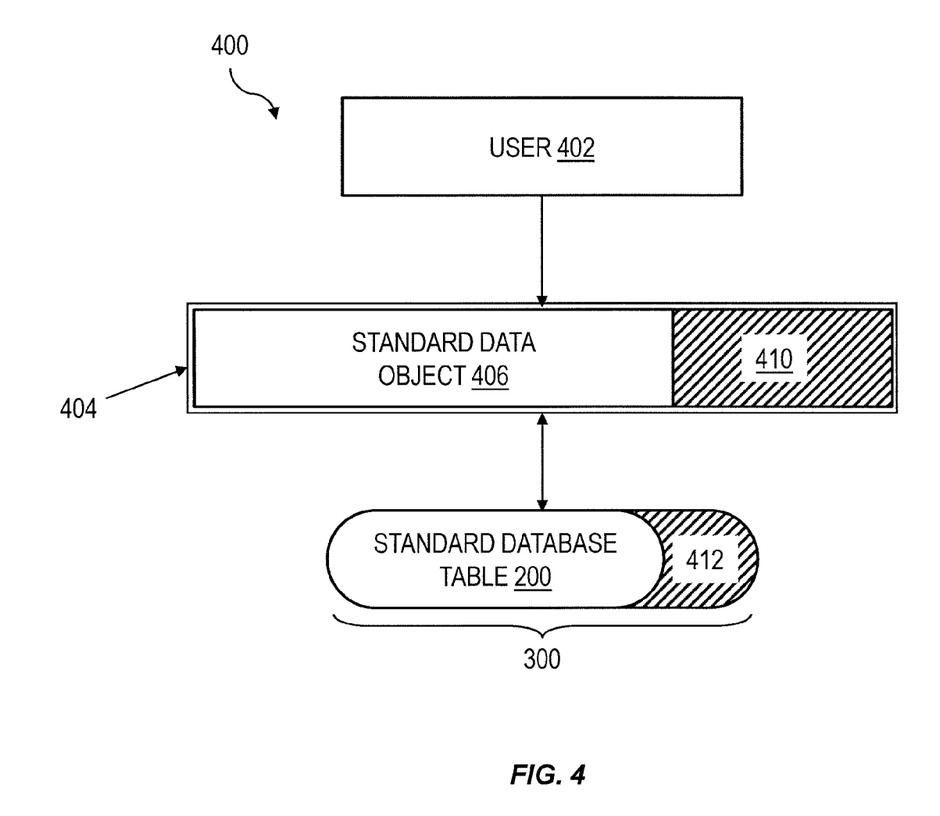
FIG. 4 shows a block diagram of a data object customization approach.

Using an approach such as that discussed above can provide client data isolation, maintain or even improve performance and processing resource consumption, and ensure that all data objects of a user are treated in a homogeneous way while providing a seamless work environment to a user such that the user's data objects are viewable and manipulable as though they are stored in a customized database table 300 such as is illustrated in FIG. 4. An a example of the potential for lessening consumption or processing and storage resources using the current subject matter can be illustrated by considering a physical system supporting 100 different users who each have one extension field added to customize the networked application. If each user's extension field were added to the standard database table as a new column, each such extension field column would contain real values for only the one user to whom the extension field belongs. This results in a majority of the cells in the extension field columns having no values. In the example of 100 users each with one extension field, each record (for example a sales order) by one of the users would be recorded on a row of the table. The user-specific extension field column for that user would include data, but the other 99 extension field columns of the other 99 users would be empty in that record. Thus, by avoiding the addition of an extension field column to a standard database table to support each extension field of each user, the current subject matter provides for a much more efficient database structure than is possible in other approaches.

During runtime, an instance 112 of the networked application 110 at a client machine 114 can result in changes to a customized data object. Upon writing the data back to the physical system, the extension framework 602 receives the customized data object 500 and splits data contained in the customized data object 500 into values associated with standard fields 502 and values associated with extension fields 504. The values associated with standard fields 502 can be stored as standard data objects in a standard persistence, such as for example the first database 120 at the storage 106 of the physical system 102. The values associated with extension fields 504 are passed to an extension field persistence adapter 604 that converts the data for storage in a generic persistence, such as for example the second database 122 at the storage 106 of the physical system 102.

Figure 7:
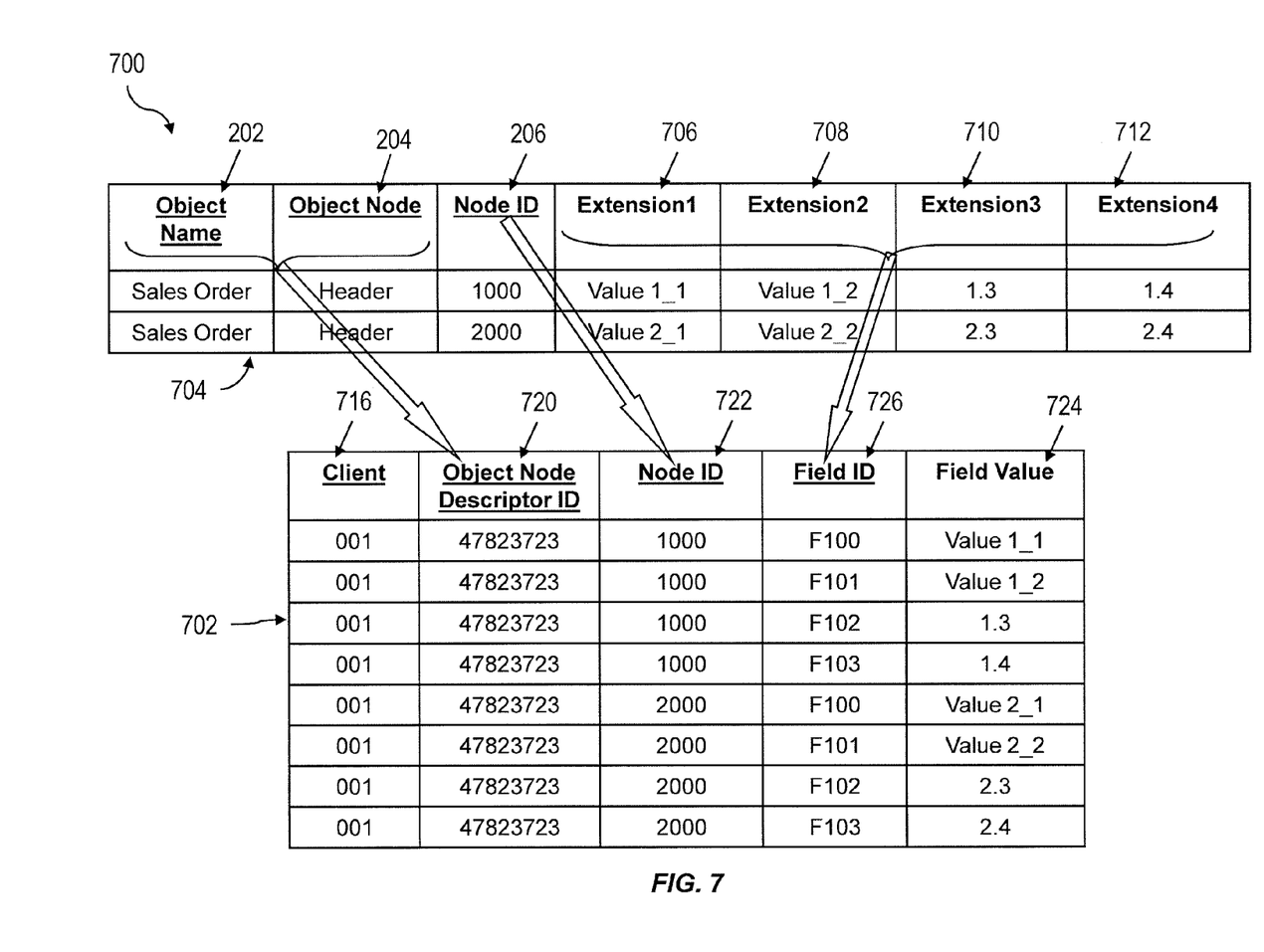
FIG. 7 shows an example of a data transformation from a data table representing a customized data object to a generic persistence.

The generic persistence 122 can be formatted as a simple database table whose structure is not user-specific. Thus, extension field data values that are split from the customized data object 500 by the extension framework 602 are converted by the extension field persistence adapter 604 into a database format with a generic structure. In one example, the generic persistence 122 can be formatted as a list table with each extension field value stored in a row. An implementation consistent with this approach is illustrated in the generic persistence table 702 shown in the data conversion illustration 700 of FIG. 7. As shown in FIG. 7, a customized data object table 704 can represent values of a customized data object. The customized data object table 702 includes standard fields "object name" 202, "object node" 204, and "node ID" 206 similar to the standard data object table 200 of FIG. 2. A user has customized the standard data object to create a customized data object that includes user specific extension fields "extension1" 706, "extension2" 708, "extension3" 710, and "extension4" 712, each of which contains values as shown. In the example of FIG. 7, after the extension framework 602 splits the standard fields from the extension fields, the extension field persistence adapter 604 converts the extension field data to a format for storage in the generic persistence table 702.

The generic persistence table 702 can include a "client" field 716 that links the extension field values in the other fields of the generic persistence table 702 to a specific user. In this manner, a single generic persistence table 702 can support multiple users. An "object node descriptor ID" field 720 of the generic persistence table 702 can be used to represent the "object name" and "object node" fields, for example by hashing the standard object identifier values to shorten the key field in the generic persistence table 702. The "node ID" field 206 of the customized data object table 704 maps to a "node ID" field 722 in the generic persistence table 702. Each value of an extension field in the customized data object table 704 maps to a different row in the generic persistence table 702. The extension field values appear in the "field value" field 724, and the "field ID" field 726 identifies which extension field in the customized data object table 704 is mapped to the specific row in the generic persistence table 702. The "field ID" can also be a hash of the extension field name as used in the customized data object table 704 to shorten the data storage requirements.

Each row in the generic persistence table 702 represents one extension field value in one instance of the customized data object. As shown in FIG. 7, two instances (denoted by node ID 1000 and node ID 2000) of a customized data object having four extension fields require a total of eight rows in the generic persistence table 702 to represent. There are a total of eight extension field values between the two customized data object instances, and this requires eight rows. Besides the extension field value, each row includes other fields that can key back to the particular user, the standard data object upon which the customized data object is based, and to which user defined extension field the extension field value is to be mapped when the customized data object is next accessed.

To optimize resource consumption, for example use of storage space in the storage 106 at the physical system, various maintenance and data management techniques can be employed. As an example, when a user defines a new extension field to create a customized data object from a standard data object, the new extension field can be assigned a default value. The default value can be a null, or some other initial value. To minimize use of storage space in the generic persistence table 702, a row need not be created to represent the value of an extension field for an instance of the customized data object if the current value of the extension field is the default or initial value. Rather, when the particular instance of the customized data object is called by an instance 112 of the networked application 110, the extension field persistence adapter 604 can determine that no record exists in the generic persistence table for that extension field in the called instance of the customized data object. If no record exists, the extension field persistence adapter 604 can insert the initial or default value for that extension field into the corresponding extension field of the instance of the customized data object supplied to the instance of the networked application.

Furthermore, the extension field persistence adapter 604 can monitor the generic persistence table 702 either periodically, continuously, or responsively to a trigger action. The monitoring can include evaluating extension field values stored in the generic persistence table 702. An example of a triggering event could be a write command from an instance 112 of the networked application. If the value of an extension field has changed from a non-initial value to an initial or default value, the row or record corresponding to that extension field for that instance of the customized data object can be deleted from the generic persistence table 702. If a first non-initial value of an extension field for an instance of the customized data object is changed to a second non-initial value of the extension field, the row or record corresponding to that extension field for that instance of the customized data object can be updated in the generic persistence table 702. If the extension field continues to have an initial or default value or if the same non-initial value remains in the extension field, no action need be taken. If an initial or default value has been replaced by a non-initial value, a new row or record corresponding to that extension field for that instance of the customized data object can be created in the generic persistence table 702.

Figure 8:
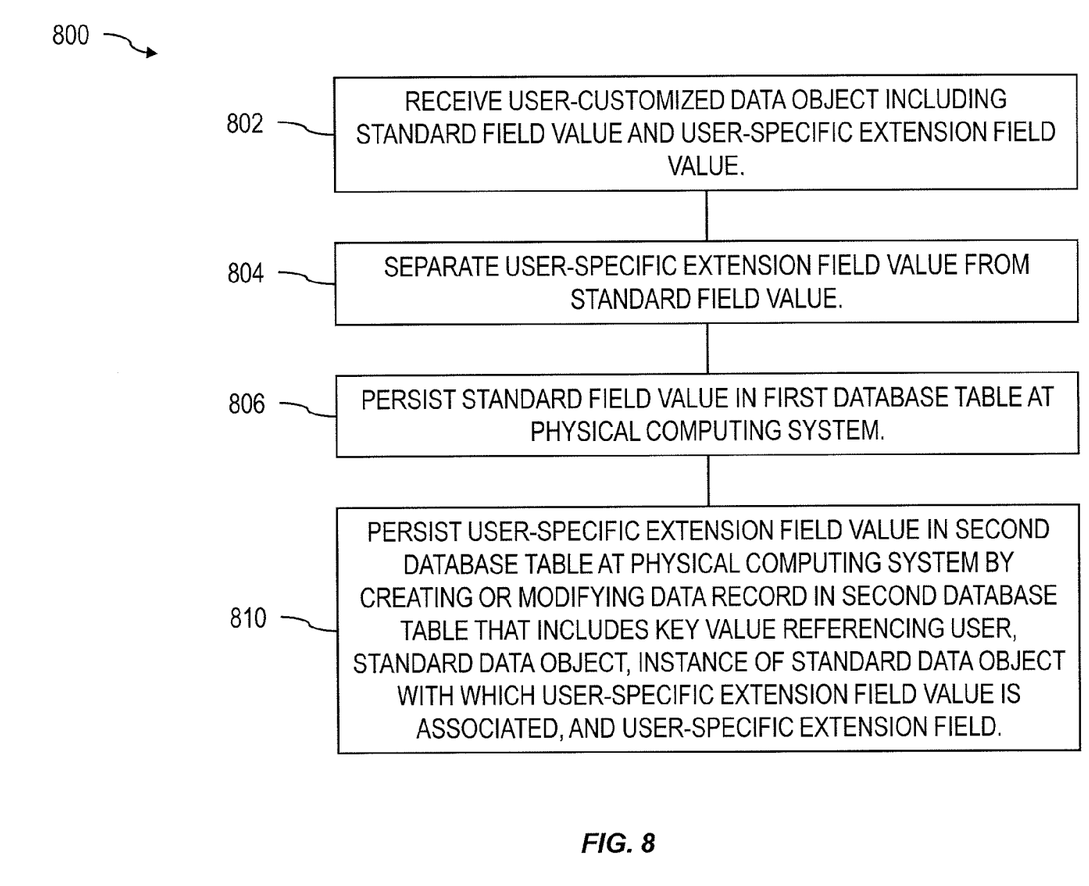
FIG. 8 shows a process flow diagram illustrating a method.

In an implementation illustrated in the process flow chart 800 of FIG. 8, a computer-implemented method can include several functions. Access to a networked application at a physical system comprising a processor and a memory is provided for a plurality of users whose data should be kept isolated. A user-customized data object is received at the physical system from one of the users at 802 to be written to the memory. The user-customized data object includes a standard field value of a standard field of a standard data object defined by the networked application and a user-specific extension field value of a user-specific extension field that modifies operation of the networked application for the user and that is not available to other users of the plurality of users. At 804, the user-specific extension field value is separated from the standard field value. The standard field value is persisted in a first database table at the physical computing system at 806. The user-specific extension field value is persisted in a second database table at the physical computing system at 810. The persisting of the user-specific extension field value includes creating or modifying a data record in the second database table. The data record includes at least one key value that references the one of the plurality of users, the standard data object, an instance of the standard data object with which the user-specific extension field value is associated, and the user-specific extension field.

Optionally, the user-customized data object can be produced for use by the user with the networked application. The producing of the user-customized data object can include reading the data record from the second database table and the standard field value from the first database table, converting the data record to the user-specific extension field value, combining the user-specific extension field value and the standard field value into the user-customized data object.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example a data server, or that includes a middleware component, such as for example an application server, or that includes a front-end component, such as for example a client computer having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. Other implementations may be within the scope of the following claims.

What is claimed:

1. A computer-implemented method comprising:
receiving, by at least one system implementing a networked application, an extension field value of an extension field of a customized data object, the customized data object comprising the extension field value of the extension field and a standard field value of a standard field, the standard field being part of a standard data object defined by the networked application, the at least one system providing access to a customized version of the networked application for users at a first organization of a plurality organizations, the networked application defining the standard data object, the customized version of the networked application comprising the customized data object such that the extension field modifies the standard object, a second version of the networked application accessible via the at least one system for users at a second organization of the plurality of organizations lacking the extension field such that the extension field value is isolated to the customized version of the networked application;

persisting the standard field value in a first database table;

persisting the extension field value in a second database table, the persisting of the extension field value comprising storing a extension field data record comprising extension field value and an extension field identifier; and producing the customized data object by combining the user-specific extension field value and the standard field value into the customized data object.

2. A computer-implemented method as in claim 1, wherein producing the customized data object further comprises:

reading the extension field data record from the second database table and the standard field value from the first database table; and converting the extension field data record to the extension field value in the extension field as part of the customized data object.

3. A computer-implemented method as in claim 1, wherein the persisting of the extension field value comprises creating the extension field data record, or deleting or modifying an existing extension field data record in the second database table, and wherein the extension field data record comprises a key value that references the organization, the standard data object, and an instance of the standard data object with which the extension field value is associated.

4. A computer-implemented method as in claim 1, wherein the customized data object comprises an additional extension field value, the method further comprising:

separating the additional extension field value from the standard field value; and persisting the additional user-specific extension field value in the second database table, the persisting of the additional user-specific extension field value comprising creating, deleting, or modifying an additional extension field data record in the second database table, the additional extension field data record comprising the additional user-specific extension field value and at least one additional key value that references the organization, the standard data object, the instance of the standard data object, and the additional extension field.

5. A computer-implemented method as in claim 4, wherein the second database table comprises a first row comprising the extension field data record, a second row comprising the additional extension field data record, and a third row comprising a second extension field data record of the second organization.

6. A computer-implemented method as in claim 1, wherein the persisting of the extension field value comprises deleting the extension field data record in the second database table when the extension field value is equivalent to a default value of the extension field.

7. An article comprising a non-transitory machine-readable medium encoding instructions that, when executed by at least one processor, cause the at least one processor to perform operations comprising:

receiving, by at least one system implementing a networked application, an extension field value of an extension field of a customized data object, the customized data object comprising the extension field value of the extension field and a standard field value of a standard field, the standard field being part of a standard data object defined by the networked application, the at least one system providing access to a customized version of the networked application for users at a first organization of a plurality organizations, the networked application defining the standard data object, the customized version of the networked application comprising the customized data object such that the extension field modifies the standard object, a second version of the networked application accessible via the at least one system for users at a second organization of the plurality of organizations lacking the extension field such that the extension field value is isolated to the customized version of the networked application;

persisting the standard field value in a first database table system;

persisting the extension field value in a second database table, the persisting of the extension field value comprising storing a extension field data record comprising extension field value and an extension field identifier; and producing the customized data object by combining the user-specific extension field value and the standard field value into the customized data object.

8. An article as in claim 7, wherein producing the customized data object further comprises:

reading the extension field data record from the second database table and the standard field value from the first database table; and converting the extension field data record to the extension field value in the extension field as part of the customized data object.

9. An article as in claim 7, wherein the persisting of the extension field value comprises creating the extension field data record, or deleting or modifying an existing extension field data record in the second database table, and wherein the extension field data record comprises a key value that references the organization, the standard data object, and an instance of the standard data object with which the extension field value is associated.

10. An article as in claim 7, wherein the customized data object comprises an additional extension field value, and wherein the operations further comprise:

separating the additional extension field value from the standard field value; and persisting the additional user-specific extension field value in the second database table, the persisting of the additional user-specific extension field value comprising creating, deleting, or modifying an additional extension field data record in the second database table, the additional extension field data record comprising the additional user-specific extension field value and at least one additional key value that references the organization, the standard data object, the instance of the standard data object, and the additional extension field.

11. An article as in claim 10, wherein the second database table comprises a first row comprising the extension field data record, a second row comprising the additional extension field data record, and a third row comprising a second extension field data record of the second organization.

12. An article as in claim 7, wherein the persisting of the extension field value comprises deleting the extension field data record in the second database table when the extension field value is equivalent to a default value of the extension field.

13. A system comprising:
computing hardware configured to perform operations comprising:
receiving, by at least one system implementing a networked application, an extension field value of an extension field of a customized data object, the customized data object comprising the extension field value of the extension field and a standard field value of a standard field, the standard field being part of a standard data object defined by the networked application, the at least one system providing access to a customized version of the networked application for users at a first organization of a plurality organizations, the networked application defining the standard data object, the customized version of the networked application comprising the customized data object such that the extension field modifies the standard object, a second version of the networked application accessible via the at least one system for users at a second organization of the plurality of organizations lacking the extension field such that the extension field value is isolated to the customized version of the networked application;
persisting the standard field value in a first database table system;
persisting the extension field value in a second database table, the persisting of the extension field value comprising storing a extension field data record comprising extension field value and an extension field identifier; and
producing the customized data object by combining the user-specific extension field value and the standard field value into the customized data object.

14. A system as in claim 13, wherein producing the customized data object further comprises:
reading the extension field data record from the second database table and the standard field value from the first database table; and
converting the extension field data record to the extension field value in the extension field as part of the customized data object.

15. A system as in claim 13, wherein the persisting of the extension field value comprises creating the extension field data record, or deleting or modifying an existing extension field data record in the second database table, and wherein the extension field data record comprises a key value that references the organization, the standard data object, and an instance of the standard data object with which the extension field value is associated.

16. A system as in claim 13, wherein the customized data object comprises an additional extension field value, and wherein the operations further comprise:
separating the additional extension field value from the standard field value; and
persisting the additional user-specific extension field value in the second database table, the persisting of the additional user-specific extension field value comprising creating, deleting, or modifying an additional extension field data record in the second database table, the additional extension field data record comprising the additional user-specific extension field value and at least one additional key value that references the one of the plurality of users organization, the standard data object, the instance of the standard data object, and the additional user specific extension field.

17. A system as in claim 16, wherein the second database table comprises a first row comprising the extension field data record, a second row comprising the additional extension field data record, and a third row comprising a second extension field data record of the second organization.

18. A system as in claim 13, wherein the persisting of the extension field value comprises deleting the extension field data record in the second database table when the extension field value is equivalent to a default value of the extension field.

19. A method as in claim 1, wherein the extension field record further comprises a client identifier identifying the organization and a standard object identifier identifying the standard object modified by the extension field.

20. An article as in claim 1, wherein the extension field record further comprises a client identifier identifying the organization and a standard object identifier identifying the standard object modified by the extension field.

* * * * *